(12) United States Patent
Kannan et al.

(10) Patent No.: US 12,266,916 B2
(45) Date of Patent: Apr. 1, 2025

(54) APPARATUS AND METHOD FOR USE IN A POWER DELIVERY SYSTEM

(71) Applicant: HAWKER SIDDELEY SWITCHGEAR LIMITED, Loughborough (GB)

(72) Inventors: Kamalaraj Kannan, Blackwood (GB); Gabor Gulics, Newport (GB); Lyn Jones, Ebbw Vale (GB); Giles Barnwell, Nottingham (GB); Daniel David McClymont, Newbold Verdon (GB); Alejandro Santana Armas, Cardiff (GB); Valentin Gruffaz, Cardiff (GB); Milica Dekic, Cardiff (GB)

(73) Assignee: HAWKER SIDDELEY SWITCHGEAR LIMITED, Leicestershire (GB)

( * ) Notice: Subject to any disclaimer, the term of this patent is extended or adjusted under 35 U.S.C. 154(b) by 80 days.

(21) Appl. No.: 18/039,099

(22) PCT Filed: Nov. 17, 2021

(86) PCT No.: PCT/GB2021/052977
§ 371 (c)(1),
(2) Date: May 26, 2023

(87) PCT Pub. No.: WO2022/112742
PCT Pub. Date: Jun. 2, 2022

(65) Prior Publication Data
US 2024/0106224 A1 Mar. 28, 2024

(30) Foreign Application Priority Data
Nov. 26, 2020 (GB) ...................... 2018623

(51) Int. Cl.
*H02H 3/087* (2006.01)
*H01H 9/26* (2006.01)
(Continued)

(52) U.S. Cl.
CPC .............. *H02H 3/087* (2013.01); *H01H 9/26* (2013.01); *H01H 9/32* (2013.01); *H01H 33/38* (2013.01);
(Continued)

(58) Field of Classification Search
CPC ............ H01H 3/264; H01H 9/32; H01H 9/26; H01H 31/003; H01H 31/10; H01H 33/52;
(Continued)

(56) References Cited

U.S. PATENT DOCUMENTS

2003/0107853 A1* 6/2003 Marchand ............ H02H 11/008
361/42
2011/0232959 A1* 9/2011 Romanet-Perroux ........................
H01H 31/003
174/520
2017/0327006 A1* 11/2017 Lane ........................ B60M 3/04

FOREIGN PATENT DOCUMENTS

CN 103692929 B * 10/2015
EP 3216042 A1 9/2017
(Continued)

OTHER PUBLICATIONS

Machine translation of Chen et al. Chinese Patent Document CN 103692929 B Oct. 2015 (Year: 2015).*
(Continued)

*Primary Examiner* — Kevin J Comber
(74) *Attorney, Agent, or Firm* — MARSHALL, GERSTEIN & BORUN LLP (57) ABSTRACT

An apparatus for use in a power delivery system, the apparatus comprising: a DC circuit breaker having first and
(Continued)

second terminals and configured to automatically switch from a closed state to an open state during an overcurrent condition; a disconnector switch in series with the DC circuit breaker, the disconnector switch having a first terminal for connecting to a first polarity terminal of a DC power supply, a second terminal for connecting to a second polarity terminal of the DC power supply and a common terminal connected to the first terminal of the DC circuit breaker, the disconnector switch having at least a first position in which the first terminal is connected to the common terminal and a second position in which the second terminal is connected to the common terminal; and an interlock mechanism coupled to the DC circuit breaker and the disconnector switch, the interlock mechanism configured to disable the DC circuit breaker from automatically switching from the closed state to the open state during the overcurrent condition when the disconnector switch is in the second position.

24 Claims, 7 Drawing Sheets

(51) Int. Cl.
*H01H 9/32* (2006.01)
*H01H 33/38* (2006.01)
*H01H 33/52* (2006.01)
*H01H 33/59* (2006.01)
*B60M 3/04* (2006.01)

(52) U.S. Cl.
CPC .......... *H01H 33/52* (2013.01); *H01H 33/596* (2013.01); *B60M 3/04* (2013.01)

(58) Field of Classification Search
CPC ...... H01H 33/596; H01H 33/38; H02H 3/087; B60M 3/04
USPC ........................................................ 361/93.1
See application file for complete search history.

(56) References Cited

FOREIGN PATENT DOCUMENTS

| | | | |
|---|---|---|---|
| GB | 2532009 A | | 5/2016 |
| JP | 2005190671 A | * | 7/2005 |

OTHER PUBLICATIONS

Machine translation of Matsuzaki et al. Japanese Patent Document JP 2005190671 A Jul. 2005 (Year: 2005).*
International Search Report and Written Opinion issued in International Pat. Appl. No. PCT/GB2021/052977, dated Apr. 4, 2022.
Search Report issued in GB Pat. Appl. No. GB2018623.5, dated May 25, 2021.

* cited by examiner

APPARATUS AND METHOD FOR USE IN A POWER DELIVERY SYSTEM

TECHNICAL FIELD

The present disclosure relates to direct current (DC) circuit breakers for use in a power delivery system and, in particular, concerns an apparatus and associated methods for disabling a DC circuit breaker from automatically opening in response to an overcurrent when the power delivery system is grounded for maintenance.

BACKGROUND

DC power delivery systems are in widespread use, e.g. in delivering power to conductor rails of transport systems. Examples include railway and tramway infrastructure where DC current is supplied to a live, e.g. positive voltage, conductor rail such as a live third rail track or a live overhead cable. Such power delivery systems require automatic circuit breaker protection to quickly and automatically disconnect the live conductor rail from a power supply in the event of an overcurrent status. Such overcurrents may be caused by numerous types of event such as damage to a cable support structure, dislodgement of a cable or rail, accidental shorting of a live conductor rail to ground, or overload condition in a load device using the power delivery system.

The power delivery systems also require a mechanism for placing the conductor rail in a safe, e.g. grounded, maintenance condition when it is necessary for personnel to work on the infrastructure. This is so that any inadvertent connection of the conductor rail to a source of power, or a lightning strike on the conductor rail somewhere in the network, does not cause damage or harm to other parts of the infrastructure or to personnel working on the infrastructure while the live conductor rail is out of service.

In existing infrastructure, one approach to providing a safe maintenance condition of the conductor rail is to manually attach a shorting bar or clamp between the conductor rail and a negative voltage return rail or a grounded rail (sometimes referred to as "rail bonding"), In order to improve efficiency and safety, another method of bonding the rails was more recently developed which involves the use of locally or remotely controlled switches. Under certain installation arrangements, however, it may be possible for the negative return current to flow through the power delivery system in the forward direction. This has the potential to trip the DC circuit breaker in the bonded configuration and leave the conductor rail live and unsafe.

The listing or discussion of a prior-published document or any background in this specification should not necessarily be taken as an acknowledgement that the document or background is part of the state of the art or is common general knowledge. One or more aspects/embodiments of the present disclosure may or may not address one or more of the background issues.

SUMMARY

According to a first aspect, there is provided an apparatus for use in a power delivery system, the apparatus comprising:

a DC circuit breaker having first and second terminals and configured to automatically switch from a closed state to an open state during an overcurrent condition;

a disconnector switch in series with the DC circuit breaker, the disconnector switch having a first terminal for connecting to a first polarity terminal of a DC power supply, a second terminal for connecting to a second polarity terminal of the DC power supply and a common terminal connected to the first terminal of the DC circuit breaker, the disconnector switch having at least a first position in which the first terminal is connected to the common terminal and a second position in which the second terminal is connected to the common terminal; and an interlock mechanism coupled to the DC circuit breaker and the disconnector switch, the interlock mechanism configured to disable the DC circuit breaker from automatically switching from the closed state to the open state during the overcurrent condition when the disconnector switch is in the second position.

The DC circuit breaker may comprise first and second contacts corresponding to the first and second terminals. The first and second contacts may be located respectively on first and second contact arms of the DC circuit breaker, and at least one of the first and second contact arms may be moveable.

The DC circuit breaker may comprise a trip device configured to cause movement of the at least one moveable contact arm during the overcurrent condition, and the interlock mechanism may be coupled to the trip device and configured to disable the DC circuit breaker by inhibiting operation of the trip device.

The trip device may comprise an electromagnetic actuator having an armature mechanically coupled to the at least one moveable contact arm. The electromagnetic actuator may be configured to generate a magnetic flux in response to an overcurrent which causes movement of the armature and a corresponding movement of the at least one moveable contact arm.

The interlock mechanism may be configured to inhibit operation of the trip device by inhibiting movement of the armature.

The armature may be mechanically coupled to the at least one moveable contact arm by a latch, and the interlock mechanism may be configured to inhibit operation of the trip device by inhibiting movement of the latch.

The electromagnetic actuator may comprise a primary armature mechanically coupled to the at least one moveable contact arm such that the magnetic flux causes movement of the primary armature and a corresponding movement of the at least one moveable contact arm, and a secondary armature configured to undergo movement when the magnetic flux exceeds a predefined magnitude. Movement of the secondary armature may reduce the reluctance of the electromagnetic actuator to trigger movement of the primary armature, and the interlock mechanism may be configured to inhibit operation of the trip device by inhibiting movement of the primary or secondary armature.

The interlock mechanism may be coupled to the at least one moveable contact arm of the DC circuit breaker and may be configured to disable the DC circuit breaker by inhibiting movement of the at least one moveable contact arm.

The interlock mechanism may comprise a mechanical or electromechanical arrangement comprising a blocking component configured to contact and physically restrain the at least one moveable contact arm, armature or latch when the disconnector switch is in the second position in order to inhibit said movement.

The interlock mechanism may be configured to inhibit operation of the trip device by diverting the magnetic flux generated by the electromagnetic actuator and thereby inhibiting movement of the armature.

The interlock mechanism may comprise a soft magnetic material configured to attract the magnetic flux away from the armature when the disconnector switch is in the second position in order to inhibit said movement.

The trip device may be a direct or indirect acting trip device.

The direct acting trip device may comprise an electromagnetic actuator. The indirect acting trip device may comprise one or more of a protection relay and a transducer.

The interlock mechanism may be configured to enable the DC circuit breaker to automatically switch from the closed state to the open state during the overcurrent condition when the disconnector switch is in the first position.

The DC circuit breaker may be a unidirectional circuit breaker configured to automatically switch from the closed state to the open state during the overcurrent condition in a forward direction and to remain in the closed state independent of current level in a reverse direction.

The DC circuit breaker may be a bidirectional circuit breaker configured to automatically switch from the closed state to the open state during the overcurrent condition in a forward direction and a reverse direction.

The forward direction may correspond to current flow from the first terminal to the second terminal of the DC circuit breaker, and the reverse direction may correspond to current flow from the second terminal to the first terminal of the DC circuit breaker.

The disconnector switch may be interlocked to prevent switching between the first and second positions while the DC circuit breaker is in the closed state.

The disconnector switch may have a third position in which both the first and second terminals are electrically isolated from the common terminal.

The disconnector switch may include a visual position indicator indicating its status in the first or second (or third) position.

The second terminal of the DC circuit breaker may be coupled to a first conductor rail of the power delivery system.

The first polarity connector of the DC power supply may be coupled to an overhead cable or third rail of a transport system, and the second polarity connector of the DC power supply may be coupled to a track of the transport system.

The disconnector switch may comprise:
  at least one moveable contact arm electrically connected to the common terminal; and
  a shutter mechanism configured to at least partially occlude a first gap between the at least one moveable contact arm and the first terminal while the disconnector switch is in the second position, and to at least partially occlude a second gap between the at least one moveable contact arm and the second terminal while the disconnector switch is in the first position.

The at least one moveable contact arm may comprise a single contact arm configured to undergo pivotal or translational motion between a first position in contact with the first terminal and a second position in contact with the second terminal. The shutter mechanism may comprise first and second shutters. The first shutter may be configured to open and close a pathway between the single contact arm and the first terminal such that the first shutter is open while the single contact arm is in the first position and closed while the single contact arm is in the second position, and the second shutter may be configured to open and close a pathway between the single contact arm and the second terminal such that the second shutter is open while the single contact arm is in the second position and closed while the single contact arm is in the first position.

The at least one moveable contact arm may comprise first and second reciprocating arms each electrically connected to the common terminal. The first reciprocating arm may be moveable between a non-contact position isolated from the first terminal and a contact position in contact with the first terminal, and the second reciprocating arm may be moveable between a non-contact position isolated from the second terminal and a contact position in contact with the second terminal. The shutter mechanism may comprise first and second shutters. The first shutter may be configured to open and close a pathway between the first reciprocating arm and the first terminal such that the first shutter is open while the first reciprocating arm is in the contact position and the second reciprocating arm is in the non-contact position, and is closed while the first reciprocating arm is in the non-contact position and the second reciprocating arm is in the contact position. The second shutter may be configured to open and close a pathway between the second reciprocating arm and the second terminal such that the second shutter is open while the second reciprocating arm is in the contact position and the first reciprocating arm is in the non-contact position, and is closed while the second reciprocating arm is in the non-contact position and the first reciprocating arm is in the contact position.

The first and second reciprocating arms may be connected to one another via a see-saw mechanism and driven by a common motor such that the first reciprocating arm moves from the non-contact position to the contact position while the second reciprocating arm moves from the contact position to the non-contact position and vice-versa.

The first and second reciprocating arms may be driven by respective motors such that the first reciprocating arm only moves from the non-contact position to the contact position once the second reciprocating arm has moved from the contact position to the non-contact position, and the second reciprocating arm only moves from the non-contact position to the contact position once the first reciprocating arm has moved from the contact position to the non-contact position.

The first and second shutters may each comprise at least one door biased to close the pathway between the at least one moveable contact arm and respective terminal, and the at least one moveable contact arm may comprise an opening member configured to force the at least one door open against the bias as the at least one moveable contact arm moves towards the respective terminal.

The at least one door may comprise one or more hinged doors which are spring or gravity biased to close the pathway, and the opening member of the at least one moveable contact arm may be configured to push the one or more hinged doors open against the spring or gravity bias as the at least one moveable contact arm moves towards the respective terminal.

The at least one door may comprise a pair of doors which come together to close the pathway. Each door may have a protruding member configured to engage the opening member of the at least one moveable contact arm, and the opening member may be shaped to wedge apart the protruding members to force the doors open against the bias as the at least one moveable contact arm moves towards the respective terminal.

The DC circuit breaker and the at least one moveable contact arm of the disconnector switch may be housed within an arc-limiting enclosure and the first and second terminals of the disconnector switch may be located outside of the arc-limiting enclosure. The shutter mechanism may be configured to open and close respective pathways out of the arc-limiting enclosure through which the at least one moveable contact arm must travel to contact the first and second terminals.

The first and second terminals of the disconnector switch may be separated from one another by an insulating barrier.

The DC circuit breaker and disconnecter switch may be formed on a common detachable unit of the power delivery system.

The common detachable unit may be mounted on wheels to facilitate detachment from, and reattachment to, the power delivery system.

The common detachable unit may further comprise one or more shunts, fuses and transducers of the power delivery system.

According to a second aspect, there is provided a method of configuring a power delivery system, the method comprising:
  connecting a disconnecter switch to a DC power supply such that a first terminal of the disconnector switch is connected to a first polarity terminal of the DC power supply and a second terminal of the disconnecter switch is connected to a second polarity terminal of the DC power supply, the disconnector switch having at least a first position in which the first terminal is connected to a common terminal of the disconnecter switch and a second position in which the second terminal is connected to the common terminal of the disconnector switch;
  connecting the common terminal of the disconnecter switch to a first terminal of a DC circuit breaker having first and second terminals and configured to automatically switch from a closed state to an open state during an overcurrent condition;
  coupling an interlock mechanism to the DC circuit breaker and the disconnecter switch such that the interlock mechanism can disable the DC circuit breaker from automatically switching from the closed state to the open state during the overcurrent condition when the disconnector switch is in the second position;
  connecting the second terminal of the DC circuit breaker to a first power line; and
  connecting the second terminal of the disconnector switch and the second polarity terminal of the DC power supply to a second power line.

The method may further comprise placing the first and second power lines in an in-service condition by switching the disconnector switch to the first position and then setting the DC circuit breaker to a closed configuration.

The method may further comprise placing the first and second power lines in a safe maintenance condition by switching the DC circuit breaker to the open state, then switching the disconnector switch to the second position, and then switching the DC circuit breaker to the closed state.

The first power line may be a live (e.g. positive) conductor rail of a railway or tramway infrastructure and the second power line may be a return (e.g. negative) conductor rail of the railway or tramway infrastructure.

According to a third aspect, there is provided a changeover switch comprising:
  first, second and common terminals;
  at least one moveable contact arm electrically connected to the common terminal and moveable between a first position in which the first terminal is connected to the common terminal and a second position in which the second terminal is connected to the common terminal; and
  a shutter mechanism configured to at least partially occlude a first gap between the at least one moveable contact arm and the first terminal while the changeover switch is in the second position, and to at least partially occlude a second gap between the at least one moveable contact arm and the second terminal while the changeover switch is in the first position.

The changeover switch may be a disconnector switch for use in a power delivery system, the first terminal may be connected to a first polarity terminal of a DC power supply, and the second terminal may be connected to a second polarity terminal of the DC power supply.

According to a fourth aspect, there is provided a method of configuring a changeover switch, the method comprising:
  providing first, second and common terminals;
  electrically connecting at least one moveable contact arm to the common terminal such that it is moveable between a first position in which the first terminal is connected to the common terminal and a second position in which the second terminal is connected to the common terminal; and
  providing a shutter mechanism configured to at least partially occlude a first gap between the at least one moveable contact arm and the first terminal while the changeover switch is in the second position, and to at least partially occlude a second gap between the at least one moveable contact arm and the second terminal while the changeover switch is in the first position.

The method may further comprise moving the at least one moveable contact arm to the first position while occluding the second gap using the shutter mechanism, or moving the at least one moveable contact arm to the second position while occluding the first gap using the shutter mechanism.

According to a fifth aspect, there is provided an apparatus as substantially described herein with reference to, and as illustrated by, the accompanying drawings.

The optional features described in relation to the disconnector switch of the apparatus of the first aspect are also applicable to the changeover switch of the third aspect where compatible.

The steps of any method disclosed herein do not have to be performed in the exact order disclosed, unless explicitly stated or understood by the skilled person.

Corresponding computer programs (which may or may not be recorded on a carrier) for implementing one or more of the methods disclosed herein are also within the present disclosure and encompassed by one or more of the described example embodiments.

The present disclosure includes one or more corresponding aspects, example embodiments or features in isolation or in various combinations whether or not specifically stated (including claimed) in that combination or in isolation. Corresponding means for performing one or more of the discussed functions are also within the present disclosure.

Throughout the present specification, descriptors relating to position, orientation or movement such as "left", "right", "up", "down", "horizontal" and "vertical", as well as any adjective and adverb derivatives thereof, are used in the sense of the position, orientation or movement of the apparatus as presented in the drawings. However, such descriptors are not intended to be in any way limiting to an intended use of the described or claimed invention.

The above summary is intended to be merely exemplary and non-limiting.

BRIEF DESCRIPTION OF THE FIGURES

A description is now given, by way of example only, with reference to the accompanying schematic drawings, in which:—

FIG. 6a shows more detail of the interlock mechanism in FIG. 4a;

FIG. 6b shows more detail of the interlock mechanism in FIG. 4b;

FIG. 7 shows another apparatus comprising an interlock mechanism for addressing the scenario shown in FIG. 3;

DESCRIPTION OF SPECIFIC ASPECTS/EMBODIMENTS

Figures 1, 1A, 1B, 1C, 1D:
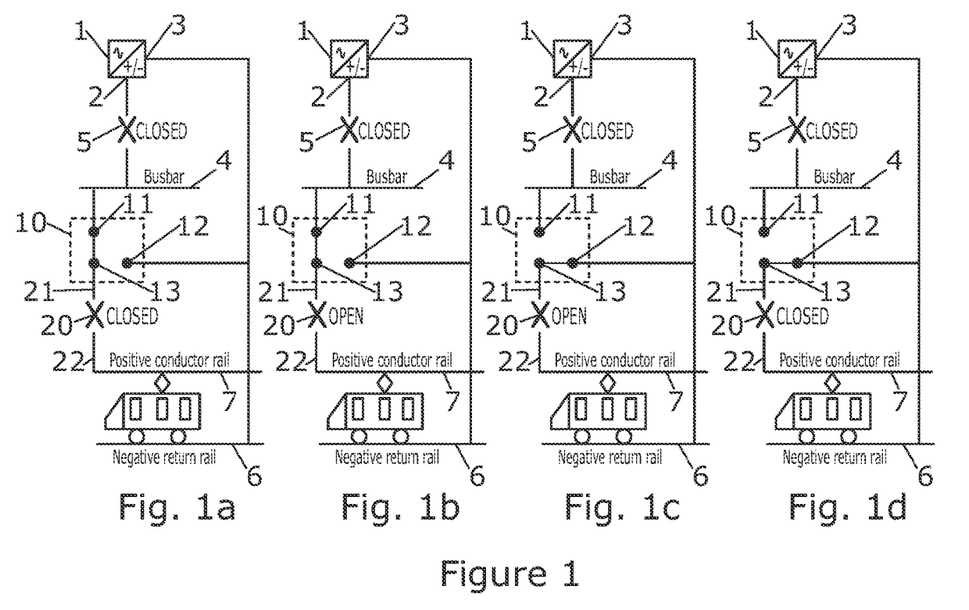
FIGS. 1a-d show different states of an electrical circuit for track bonding.

FIG. 1a shows a schematic representation of a power delivery system for delivering power to the conductor rails of a railway infrastructure. A DC power supply 1 has a positive output terminal 2 and a negative output terminal 3. The DC power supply 1 may be a rectifier receiving an alternating current (AC) input. The positive output terminal 2 is connected to a busbar 4 via a circuit breaker 5. The bus bar 4 is connected to a disconnector switch 10 which is connected to a unidirectional circuit breaker 20. The negative output terminal 3 of the power supply 1 is connected to a negative return conductor rail 6 of the railway infrastructure. The circuit breaker 20 is connected to a positive conductor rail 7 of the railway infrastructure.

In one configuration, the positive conductor rail 7 may be an overhead cable or catenary suitable for current collection by a pantograph. In another configuration, the positive conductor rail may be a live third rail, e.g. a rigid conductor placed alongside or between the rails of a railway track. The negative return conductor rail 6 may be a railway track or tram track.

The disconnector switch 10 has a first terminal 11 which is electrically connected to the busbar 4 and, thereby, to the positive output terminal 2 of the power supply 1. The disconnector switch 10 has a second terminal 12 which is electrically connected to the negative output terminal 3 of the power supply 1 and to the negative return conductor rail 6. The disconnector switch 10 has a third terminal which may be described as a common terminal 13 which is connected to a first terminal 21 of the unidirectional circuit breaker 20. The disconnector switch 10 has a first position in which its first terminal 11 is electrically connected to the common terminal 13, and a second position in which its second terminal 12 is connected to the common terminal 13, e.g. a single pole, two position configuration.

The circuit breaker 20 has a first terminal 21 and a second terminal 22 and is unidirectional in the sense that it is configured to automatically open contacts of the circuit breaker upon detection of an overcurrent condition in a first (forward) direction, in this instance for current flowing from the first terminal 21 to the second terminal 22, whereas it does not automatically open contacts of the circuit breaker in the event of current flow or overcurrent flow in the reverse direction, i.e. current flowing from the second terminal 22 to the first terminal 21. The circuit breaker 20 can be configured to trip in the forward direction at any suitable current level considered as an overcurrent condition.

The busbar 4 may feed other disconnector and circuit breaker apparatus not shown in the drawings, e.g. those configured to feed other segments of the conductor rails 6, 7, of the railway infrastructure.

In use, the power delivery system would be in a normal service ("feeder") configuration as shown in FIG. 1a in which power is delivered from the power supply 1 to the rails 6 and 7 by the circuit breaker 5 being closed (as labelled), the disconnector switch 10 being in the first position as shown (terminals 11 and 13 connected) and the circuit breaker 20 being closed (as labelled).

To bring the power delivery system into a safe ("bonded") configuration for maintenance, not only must the connection between the busbar 4 and the positive conductor rail 7 be broken, but also the positive and negative rails 6, 7 must be shorted together.

In a first step, as shown in FIG. 1b, the circuit breaker 20 is set to an open condition, e.g. by intentionally tripping the circuit breaker with a manual override or electronic actuation, or by an actual overcurrent fault condition which caused the circuit breaker to open automatically. It can be seen that the disconnector switch 10 is now off-load and can be safely switched to the second position (terminals 12 and 13 connected) as indicated in FIG. 1c.

In FIG. 1c, the disconnector switch 10 is now in the second position connecting the second terminal 12 to the common terminal 13, and thus the negative conductor rail 6 and negative terminal 3 of the power supply 1 are coupled to the circuit breaker first terminal 21. At this time, the circuit breaker 20 is reset or otherwise made to close the circuit breaker contacts and effectively short together the positive conductor rail 7 and the negative conductor rail 6, leaving the conductor rail 7 in a safe condition for maintenance etc, as shown in FIG. 1d. To reconnect the power delivery system to an in-service condition, the steps discussed above are reversed.

In the arrangement shown, the positive terminal 2 of the power supply 1 has a first polarity and is connected to the disconnector switch 10, circuit breaker 20 and "live" conductor rail 7, while the negative terminal 3 has a second polarity and is connected to a "safe" negative return rail 6 which is generally held at or close to ground potential. It will be recognised, however, that this could be reversed with a positive terminal 2 of the power supply being connected as a "safe" potential at or near ground potential and the negative terminal 3 providing power to the "live" conductor rail 7. In this respect, the first and second polarities of the power supply terminals can be reversed.

The disconnector switch 10 may also be provided with a third, stable, position (not shown) corresponding to an intermediate or "isolation" position in which neither the first terminal 11 nor the second terminal 12 is electrically connected to the common terminal 13, such that both the first and second terminals 11, 12 are electrically isolated from the common terminal 13. In this way, the conductor rail 7 can be completely isolated from the positive and negative output terminals 2, 3 of the power supply 1.

Figure 2A:
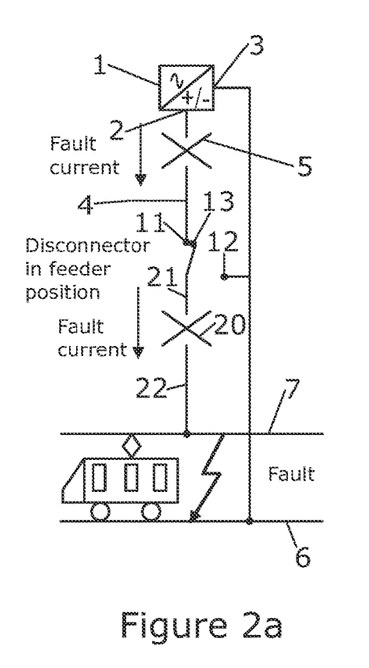
FIG. 2a shows a flow of fault current through the electrical circuit in a feeder configuration.
Figure 2B:
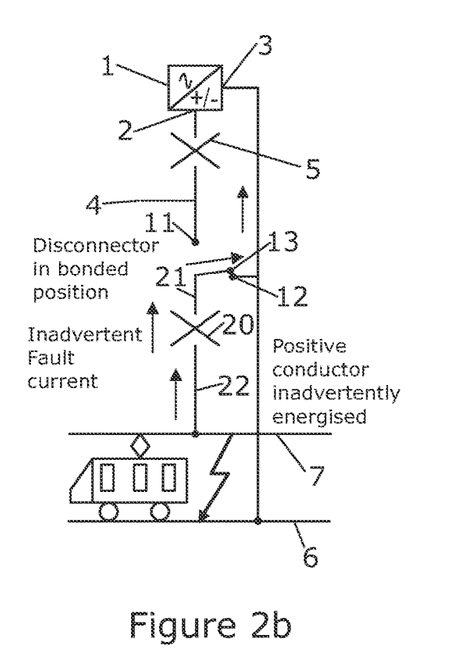
FIG. 2b shows a flow of fault current through the electrical circuit in a bonded configuration.

FIGS. 2a and 2b are schematic representations of the power delivery system showing a flow of overcurrent (fault current) through the electrical circuit of FIG. 1 in the feeder and bonded configurations, respectively. When the overcurrent is flowing in the busbar-to-cable direction in the feeder configuration as indicated in FIG. 2a, the unidirectional circuit breaker 20 will trip to disconnect the live conductor rail 7 from the power supply 1. On the other hand, when the overcurrent is flowing in the cable-to-bond direction in the bonded configuration as indicated in FIG. 2b, the circuit breaker 20 will remain closed to allow the current to flow to ground via the negative return rail 6. The unidirectionality of the circuit breaker 20 thereby ensures that an inadvertent or accidental connection of the rail 7 to a power supply or its exposure to an electrical discharge such as a lightning strike will not trip the circuit breaker 20 to an open condition which would leave the conductor rail 7 potentially live and unsafe.

As mentioned in the background section, however, there is a scenario where it may be possible for negative return current to flow through the power delivery system in the forward direction which has the potential to trip the DC circuit breaker 20 in the bonded configuration.

Figure 3:
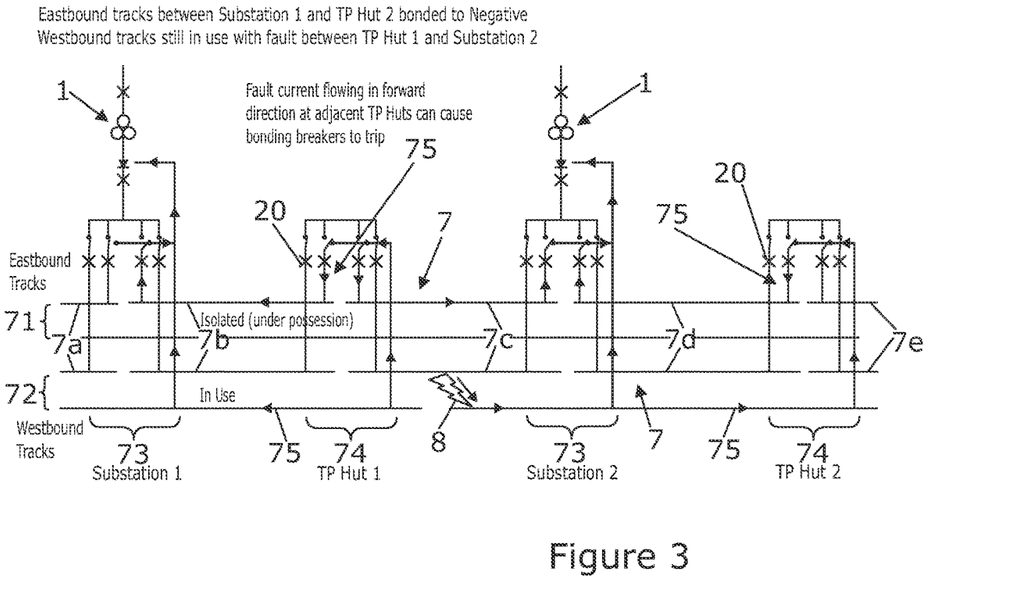
FIG. 3 shows a flow of fault current from an adjacent track through a track paralleling hut to a neighbouring substation.

FIG. 3 is a schematic representation showing a section of a railway comprising eastbound 71 and westbound 72 tracks. The DC power for the railway is provided by a series of substations 73 spaced along the tracks. The substations 73 convert the AC supply to DC and boost the voltage to accommodate losses due inefficiencies in the conductor rail 7. Between these substations 73 are track paralleling (TP) huts 74 which are used for connecting and disconnecting adjacent sections 7a-e of the conductor rail 7. Unfortunately, many TP huts 74 do not have a rectifier supply 1 and hence no local negative terminal. As such, when the conductor rail 7 of one track 72 is live (the westbound track in this example) and the conductor rail 7 of a proximal track 71 is grounded (the eastbound track in this example), up to 50% of the negative return current 75 on the westbound track 72 can flow through the TP huts 74 in the forward direction towards the negative terminal of the power supply 1 at the nearest substation 73. If a fault 8 on the live (westbound) track 72 gives rise to an overcurrent 75, this can then trip the unidirectional circuit breakers in the TP huts 74 open and leave the grounded conductor rail 7 on the proximal (eastbound) track 71 live and unsafe.

There will now be described an apparatus and associated methods that may address this issue. Other examples depicted in the figures have been provided with reference numerals that correspond to similar features of earlier described examples. These numbered features may appear in the figures but may not have been directly referred to within the description of these particular examples. These have still been provided in the figures to aid understanding of the further examples, particularly in relation to the features of similar earlier described examples.

Figure 4A:
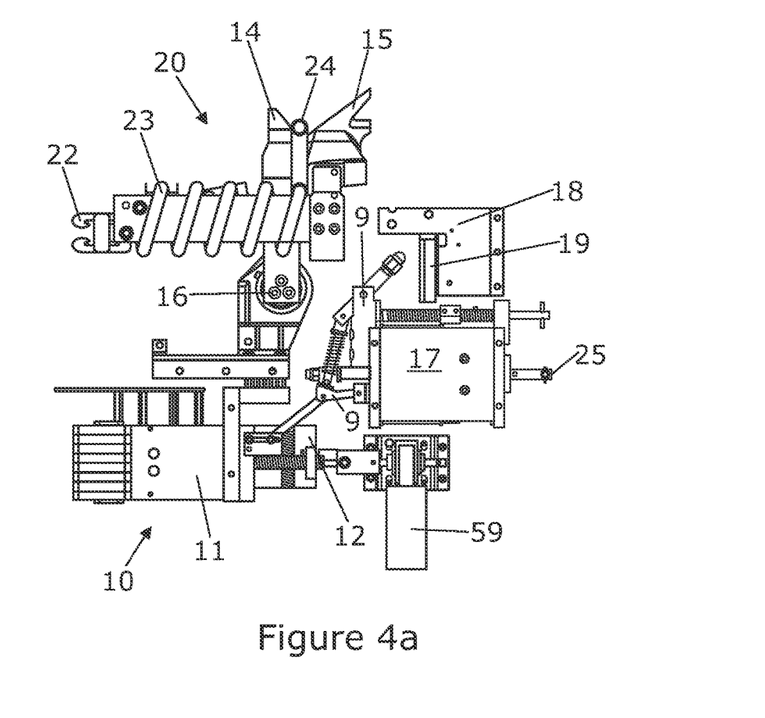
FIG. 4a shows an apparatus comprising an interlock mechanism for addressing the scenario shown in FIG. 3 in an unlocked state.
Figure 4B:
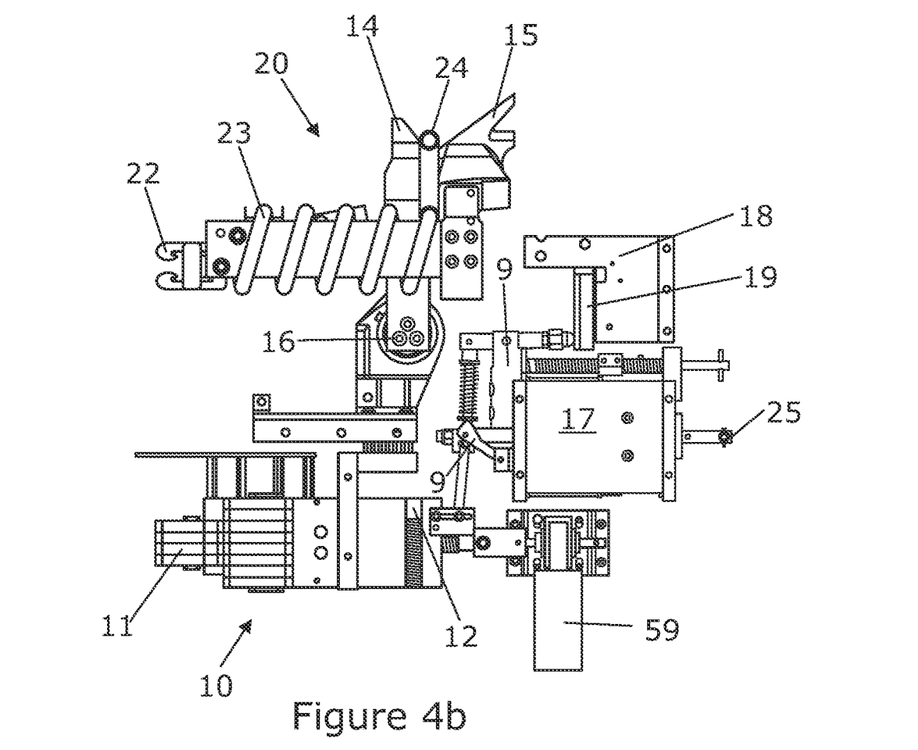
FIG. 4b shows the apparatus in FIG. 4a with the interlock mechanism in a locked state.

FIGS. 4a and 4b show a side view of one example of an apparatus for use in a power delivery system. In addition to the DC circuit breaker 20 and disconnector switch 10 described previously, the apparatus comprises an interlock mechanism 9. The interlock mechanism 9 is coupled to the DC circuit breaker 20 and disconnector switch 10, and is configured to disable the DC circuit breaker 20 from automatically switching from the closed state to the open state during the overcurrent condition when the disconnector switch 10 is in the second position (i.e. the bonded state). This helps to ensure continuity of the bond. Given the inclusion of the interlock mechanism 9, the DC circuit breaker 20 no longer needs to be unidirectional. As such, it could be a bidirectional circuit breaker configured to automatically switch from the closed state to the open state during the overcurrent condition in the forward direction and the reverse direction.

The DC circuit breaker 20 comprises first and second contacts corresponding to the first 21 and second 22 terminals (the first terminal 21 is not visible from this perspective). The first and second contacts are located respectively on first 14 and second 15 contact arms of the DC circuit breaker 20. In this example, the first contact arm 14 is moveable by rotating about a pivot 16 whilst the second contact arm 15 is fixed in position, but both contact arms 14, 15 could be moveable. When the DC circuit breaker 20 is in the closed state, the first and second contacts are in physical (and thus electrical) contact with one another to allow a flow of current therebetween.

The DC circuit breaker 20 also comprises an actuator 17 configured to cause movement of the moveable contact arm 14 in response to a control signal to open the DC circuit breaker 20, and a trip device 18 comprising an armature 19 configured to cause movement of the moveable contact arm 14 during the overcurrent condition. Movement of the moveable contact arm 14 separates the first and second contacts from one another to form a contact gap, thereby switching the DC circuit breaker 20 from the closed state to the open state. An optional arc displacement mechanism can also be seen in FIGS. 4a and 4b. This comprises a soft magnetic winding 23 configured to generate a magnetic flux in response to the control signal or overcurrent. The ends 24 of the soft magnetic winding 23 are positioned on opposite sides of the contact gap and are shaped to form a flux gap which traverses the contact gap. Furthermore, the ends 24 of the soft magnetic winding 23 are also shaped to be divergent above the flux gap towards an arc suppressor such as an arc chute (not shown). When an electric arc is formed between the first and second contacts of the DC circuit breaker 20, the magnetic flux traversing the contact gap directs the arc towards the arc suppressor where the arc is rapidly suppressed.

The actuator 17 may comprise any existing mechanism to open the DC circuit breaker 20, In FIGS. 4a and 4b, the actuator 17 takes the form of an electromagnetic latch configured to release the stored energy in a compressed spring and cause linear movement of a plunger 25. The plunger 25 then contacts the moveable contact arm 14 which rotates about the pivot 16 and separates the first and second contacts.

Figure 5:
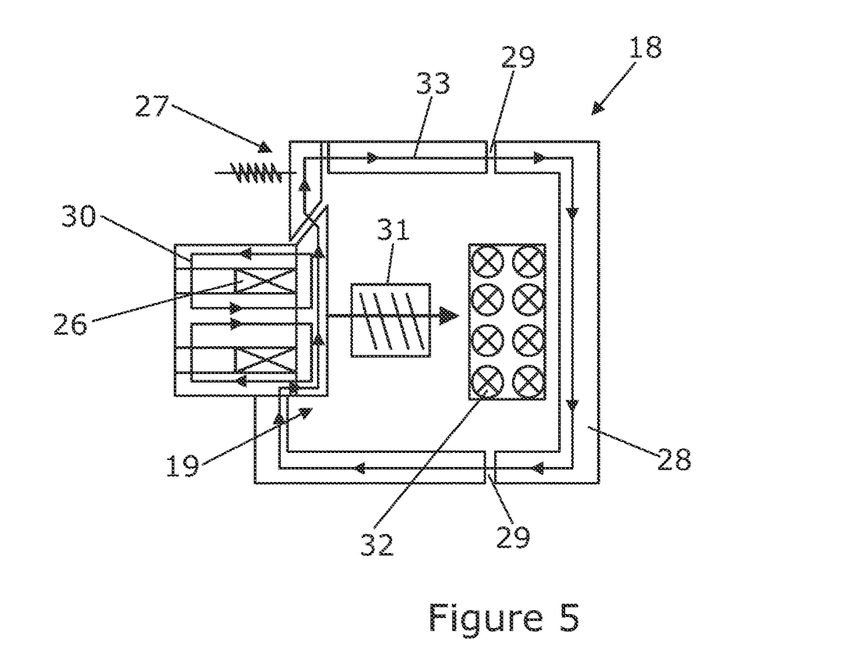
FIG. 5 shows a trip device of a DC circuit breaker in a tripped state.

FIG. 5 shows more detail of the trip device 18 in schematic form. In this example, the trip device 18 is a direct acting trip device comprising an electromagnetic actuator, but it could alternatively be an indirect acting trip device (e.g. comprising a protection relay or a transducer). The electromagnetic actuator comprises permanent magnets 26 and an adjacent (primary) armature 19 which is mechanically coupled to the moveable contact arm. The armature 19 forms part of a yoke 28 having a predefined air gap 29. The flux from the permanent magnets 26 results in a holding force on the armature 19 against the stored force of a compressed spring 31. In an overcurrent condition, the current flows through a coil 32 of the electromagnetic actuator which induces a flux 33 in the yoke 28 that opposes the flux 30 of the permanent magnets 26. At a predefined magnitude of overcurrent (and thus flux 33), the stored force of the compressed spring 31 exceeds the holding force of the permanent magnets 26 and releases the armature 19. The predefined magnitude of overcurrent/flux 33 is at least partly determined by the size of the air gap 29 in the yoke 28. The armature 19 then accelerates forwards under the action of the spring 31 which causes movement of the moveable contact arm to trip the DC circuit breaker.

In some examples, the electromagnetic actuator may further comprise a secondary armature 27 configured to undergo movement when the flux 33 in the yoke 28 exceeds the predefined magnitude. As shown in FIG. 5, movement of the secondary armature 27 reduces the reluctance of the yoke 28 to trigger movement of the primary armature 19. This helps to prevent the trip device from gradually becoming unstable at currents approaching the predefined magnitude. Instead, the secondary armature 27 provides a step change to the tripping flux 33 which ensures that the trip device opens the DC circuit breaker at the correct current level.

As shown in the apparatus of FIGS. 4a and 4b, the interlock mechanism 9 is coupled between the disconnector switch 10 and the trip device 20 (the mechanical coupling between the trip device 18 and the moveable contact arm 14 is not shown). When the disconnector switch 10 is in the first position (FIG. 4a), the interlock mechanism 9 is in an unlocked state which allows movement of the primary armature 19 in the overcurrent condition. This enables the DC circuit breaker 20 to disconnect the live conductor rail from the power supply when the apparatus is in the feeder configuration. When the disconnector switch 10 is in the second position (FIG. 4b), however, the interlock mechanism 9 is in a locked state which inhibits (e.g. restricts or even prevents) movement of the primary armature 19 in the overcurrent condition. This disables the DC circuit breaker 20 from automatically switching from the closed state to the open state when the apparatus is in the bonded configuration.

Figures 6A, 6B, 7:
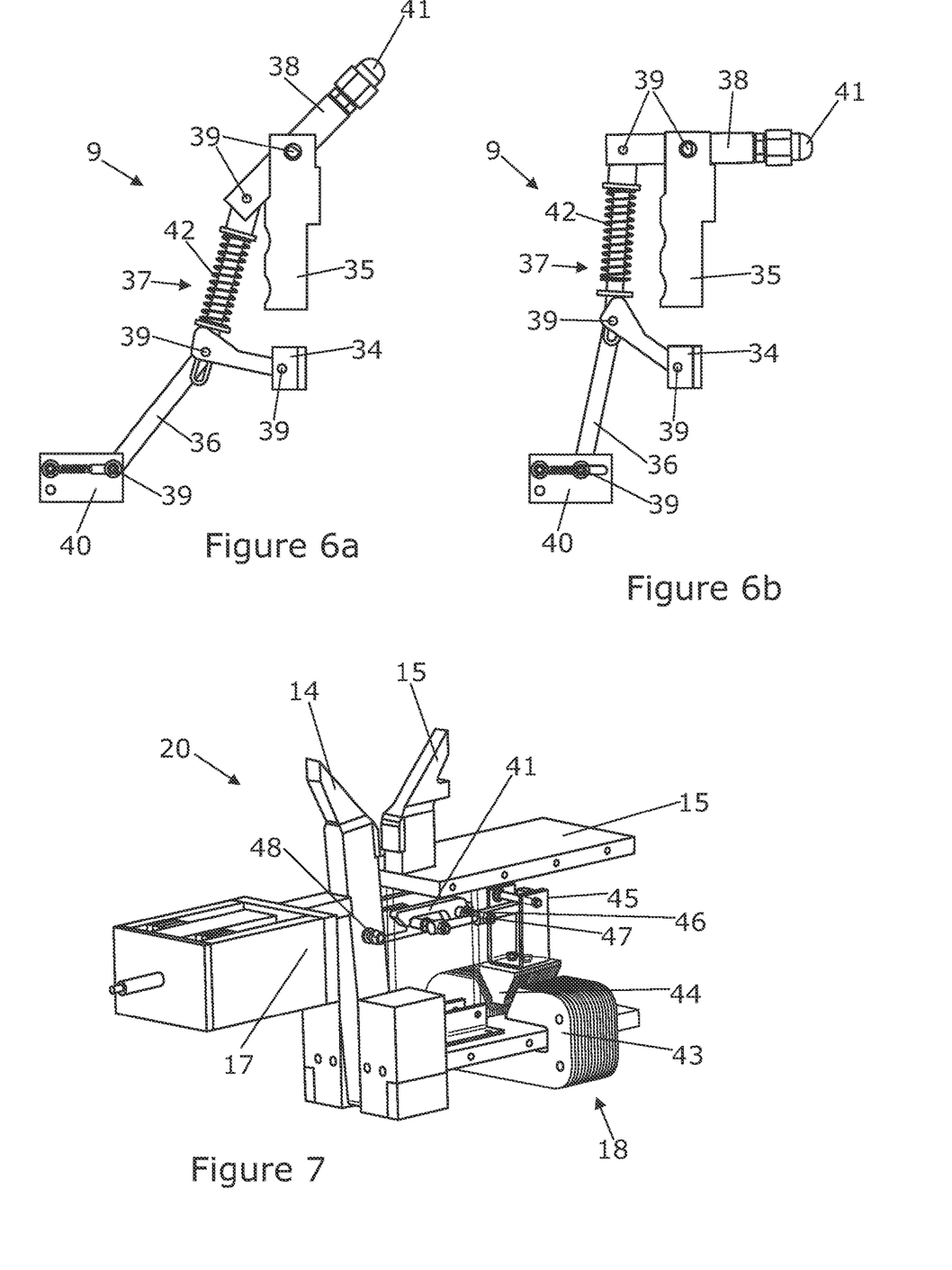

FIGS. 6a and 6b show greater detail of the interlock mechanism 9 of FIGS. 4a and 4b in side-view. As shown, the interlock mechanism 9 comprises a mechanical arrangement (although it could alternatively be electromechanical) which is fixed to the actuator 17 by first 34 and second 35 brackets. The mechanical arrangement has proximal 36, middle 37 and distal 38 link arms which are pivotally coupled to one another at pivots 39, One end of the proximal link arm 36 is pivotally coupled to the disconnector switch 10 by a sliding connector 40, and the proximal 36 and middle 37 link arms are pivotally coupled to the first bracket 34 by a further pivot 39. The distal link arm 38 is pivotally coupled at its midpoint to the second bracket 35 and has a blocking component 41 at one end. To help ensure that the interlock mechanism 9 functions repeatably, the middle link arm 37 comprises a spring 42. This prevents problems associated with component tolerance between different units and between operations of the same unit, where the disconnector switch 10 may stop in a slightly different position each time owing to external factors such as the motor voltage.

When the disconnector switch 10 is switched from the first position to the second position, the interlock mechanism 9 changes from the configuration shown in FIG. 6a to the configuration shown in FIG. 6b. As illustrated, the sliding connector 40 moves to the right causing the proximal link arm 36 to rotate about the connecting pivot 39 into a more vertical orientation. This causes the middle link arm 37 and the connected end of the distal link arm 38 to be raised. Since the distal link arm 38 is pivotally coupled to the second bracket 35 at its midpoint, the distal link arm 38 rotates into a more horizontal orientation in which the blocking member 41 abuts the (primary) armature 19 of the electromagnetic actuator thereby inhibiting movement of the same.

FIG. 7 shows a perspective view of another example of the present apparatus. In this example, the electromagnetic actuator of the trip device 18 comprises fixed 43 and moving 44 cores. The moving core 44 is attached to an armature 45 which in turn is mechanically coupled to the moveable contact arm 14 by a latch 46. As shown, the latch 46 is configured to rotate about a first pivot 47. In the event of an overcurrent, current flow through the fixed core 43 gives rise to a magnetic flux which attracts the moving core 44. This results in downward movement of the armature 45 which causes rotation of the latch 46 about the first pivot 47 and a corresponding rotation of the moveable contact arm 14 about a second pivot 48.

In order to inhibit the corresponding movement of the moveable contact arm 14, the interlock mechanism 9 is configured to inhibit movement of the latch 46. To achieve this, the interlock mechanism 9 comprises a blocking component 41 in the form of a hook coupled between the latch 46 and the moveable contact arm 14 when the disconnector switch is in the second position. In an alternative arrangement, the hook 41 could be coupled between the armature 45 and the moveable contact arm 14 instead.

In a further example (not illustrated), the interlock mechanism 9 may be configured to disable the trip device 18 magnetically rather than mechanically. In this scenario, the interlock mechanism 9 may be configured to divert the magnetic flux 33 generated by the electromagnetic actuator and thereby inhibit movement of the armature 19, 45. This could be achieved by forming the interlock mechanism 9 from a soft magnetic material configured to attract the magnetic flux 33 away from the armature 19, 45 or moving core 44.

Furthermore, rather than disabling the DC circuit breaker 20 by inhibiting operation of the trip device 18, the interlock mechanism 9 could be coupled to, and configured to inhibit movement of, the moveable contact arm 14 itself. Although not illustrated, it will be appreciated that this could be achieved using a variety of different (electro)mechanical interlock configurations comprising a blocking component 41 configured to contact and physically restrain the moveable contact arm 14.

The apparatus described herein may be modified to include an interlock system which prevents the disconnector switch 10 from being operated in one or both directions when the circuit breaker 20 is in the closed condition. Also, if the disconnector switch 10 is provided with a third ('isolation') position, the interlock system may be configured to prevent the disconnector switch 10 from being switched to one or more of the first, second and third positions.

Figure 8A:
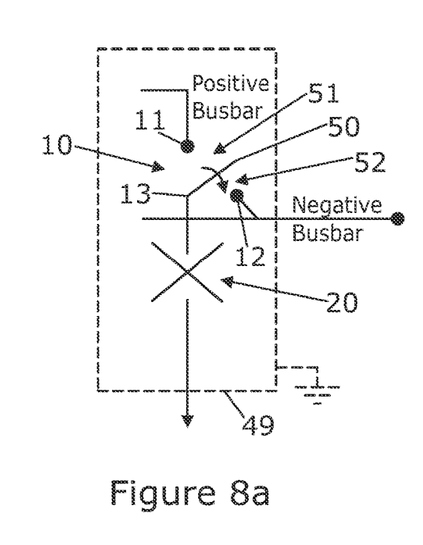
FIG. 8a shows a disconnector/changeover switch comprising a single moveable contact arm configured to undergo pivotal motion.

FIG. 8*a* shows a schematic diagram of a disconnector switch 10 in series with the DC circuit breaker 20 which are contained within an earthed cubicle 49. In this example, the disconnector switch 10 comprises a moveable contact arm 50 electrically connected to the common terminal 13 which is configured to undergo pivotal motion between a first position in contact with the first terminal 11 (connected to the positive busbar) and a second position in contact with the second terminal 12 (connected to the negative busbar).

Figure 8B:
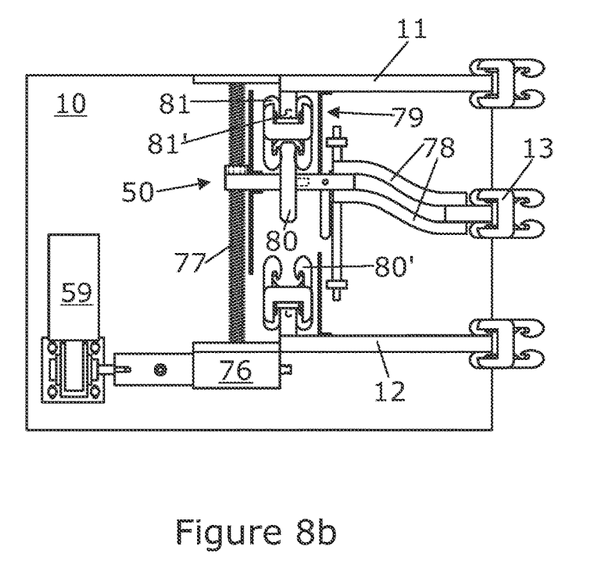
FIG. 8b shows a disconnecter/changeover switch comprising a single moveable contact arm configured to undergo translational motion.

FIG. 8*b* shows an alternative disconnector switch 10 in which the moveable contact arm 50 is configured to undergo translational motion between the first and second positions. In this example, the moveable contact arm 50 is attached to a drive screw 77 which is rotated by a motor 59 and gearbox 76 to drive the moveable contact arm 50 along the axis of the drive screw 77. The moveable contact arm 50 comprises a connector 79 having male 80 and female 81 portions for forming a physical (and electrical) connection with corresponding portions 80', 81' on the first 11 and second 12 terminals. In order to accommodate the lateral movement without disconnecting from the common terminal 13, a section of the moveable contact arm 50 is formed from a flexible electrically conductive material 78 (e.g. bendable metal strips such as flexible copper).

An issue with disconnector switches 10, however, is the proximity of the first 11 and second 12 terminals. In order to be able to switch between the first and second positions, the terminals 11, 12 are typically located relatively close to one another. This gives rise to the possibility of a flashover (or arc flash) between the terminals 11, 12 with a positive-to-negative fault current as high as 200,000A.

The present apparatus may be configured to address this issue by incorporating a shutter mechanism into the disconnector switch 10 which is driven by the moveable contact arm 50. The shutter mechanism may be configured to at least partially occlude a first gap 51 between the moveable contact arm 50 and the first terminal 11 while the disconnector switch 10 is in the second position, and to at least partially occlude a second gap 52 between the moveable contact arm 50 and the second terminal 12 while the disconnector switch 10 is in the first position. By occluding the gap 51, 52 between the moveable contact arm 50 and the other terminal, the likelihood of an electric arc forming between the terminals 11, 12 is reduced. Although there is still the possibility of a flashover occurring between the first (positive) terminal 11 and the earthed cubicle 49, the positive-to-earth fault current is likely to be less than 15,000A. The presence of the shutter mechanism therefore reduces the maximum potential fault current and the severity of the electrical explosion during a flashover event.

Although not illustrated in FIG. 8*a* or 8*b*, one example of the shutter mechanism comprises first and second shutters. The first and second shutters may comprise an electrically conductive material (e.g. formed from a metal or alloy such as steel) or an electrically insulating material (e.g. formed from polycarbonate or another electrically insulating material). In this example, the first shutter is configured to open and close a pathway between the moveable contact arm 50 and the first terminal 11 such that the first shutter is open while the moveable contact arm 50 is in the first position and closed while the moveable contact arm 50 is in the second position. Similarly, the second shutter is configured to open and close a pathway between the moveable contact arm 50 and the second terminal 12 such that the second shutter is open while the moveable contact arm 50 is in the second position and closed while the moveable contact arm 50 is in the first position.

Figure 9:
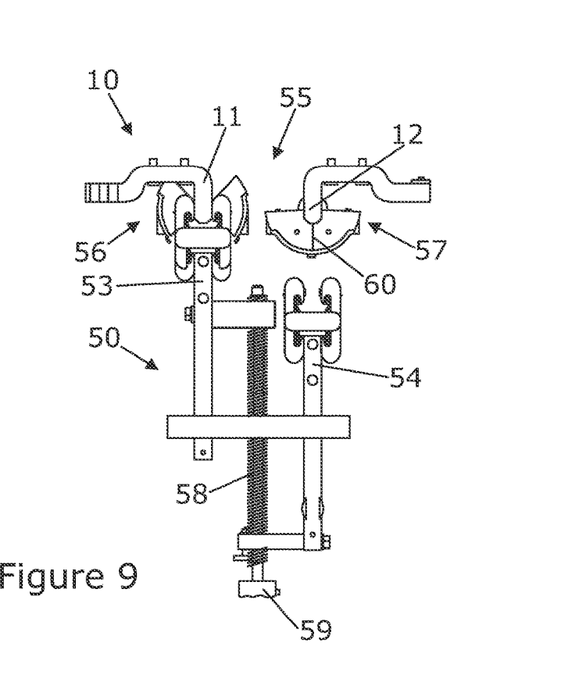
FIG. 9 shows another disconnector/changeover switch comprising first and second moveable contact arms and respective shutters.

FIG. 9 shows another example of a disconnector switch 10 in plan-view. In this example, the moveable contact arm 50 comprises first 53 and second 54 reciprocating arms each electrically connected to the common terminal 13. The first reciprocating arm 53 is moveable between a non-contact position isolated from the first terminal 11 and a contact position in contact with the first terminal 11, and the second reciprocating arm 54 is moveable between a non-contact position isolated from the second terminal 12 and a contact position in contact with the second terminal 12. With this example, it is important not only that the gap 55 between the first 11 and second 12 terminals is occluded to help prevent a direct flashover therebetween, but also that the pathway between each reciprocating arm 53, 54 and the respective terminal 11, 12 is closed when the reciprocating arm 53, 54 is in the non-contact position. This is because the first 53 and second 54 reciprocating arms are electrically connected to one another and are therefore at the same potential. As such, closing the pathway helps prevent an indirect flashover occurring between the first 11 and second 12 terminals via the first 53 and second 54 reciprocating arms.

The shutter mechanism of this example also comprises first 56 and second 57 shutters. The first shutter 56 is configured to open and close a pathway between the first reciprocating arm 53 and the first terminal 11 such that the first shutter 56 is open while the first reciprocating arm 53 is in the contact position and the second reciprocating arm 54 is in the non-contact position, and is closed while the first reciprocating arm 53 is in the non-contact position and the second reciprocating arm 54 is in the contact position. Similarly, the second shutter 57 is configured to open and close a pathway between the second reciprocating arm 54 and the second terminal 12 such that the second shutter 57 is open while the second reciprocating arm 54 is in the contact position and the first reciprocating arm 53 is in the non-contact position, and is closed while the second reciprocating arm 54 is in the non-contact position and the first reciprocating arm 53 is in the contact position.

As shown in FIG. 9, the first and second reciprocating arms 53, 54 are connected to one another via a see-saw mechanism 58 and driven by a common motor 59 such that the first reciprocating arm 53 moves from the non-contact position to the contact position while the second reciprocating arm 54 moves from the contact position to the non-contact position and vice-versa. Nevertheless, the first 53 and second 54 reciprocating arms could alternatively be driven by respective motors such that the first reciprocating arm 53 only moves from the non-contact position to the contact position once the second reciprocating arm 54 has moved from the contact position to the non-contact position, and the second reciprocating arm 54 only moves from the non-contact position to the contact position once the first reciprocating arm 53 has moved from the contact position to the non-contact position. With the former arrangement, there may be a short time interval where both the first 56 and second 57 shutters are partially open at the same time. The latter arrangement may therefore provide a slightly higher level of arc protection.

The first 56 and second 57 shutters may each comprise at least one door 60 biased to close the pathway between the at least one moveable contact arm 50 and respective terminal 11, 12, and the at least one moveable contact arm 50 may comprise an opening member 61 configured to force the at least one door 60 open against the bias as the at least one moveable contact arm 50 moves towards the respective terminal 11, 12. For example, the shutters 56, 57 may comprise a single hinged door or a pair of hinged doors 60 which are biased by a spring or gravity, and the opening member may be configured to push the door(s) 60 against the bias of the spring/gravity. It would also be possible to use electronic controls configured to send a signal to one or more sliding doors to open or close them based on the sensed position of the at least one moveable contact arm 50.

Figure 10:
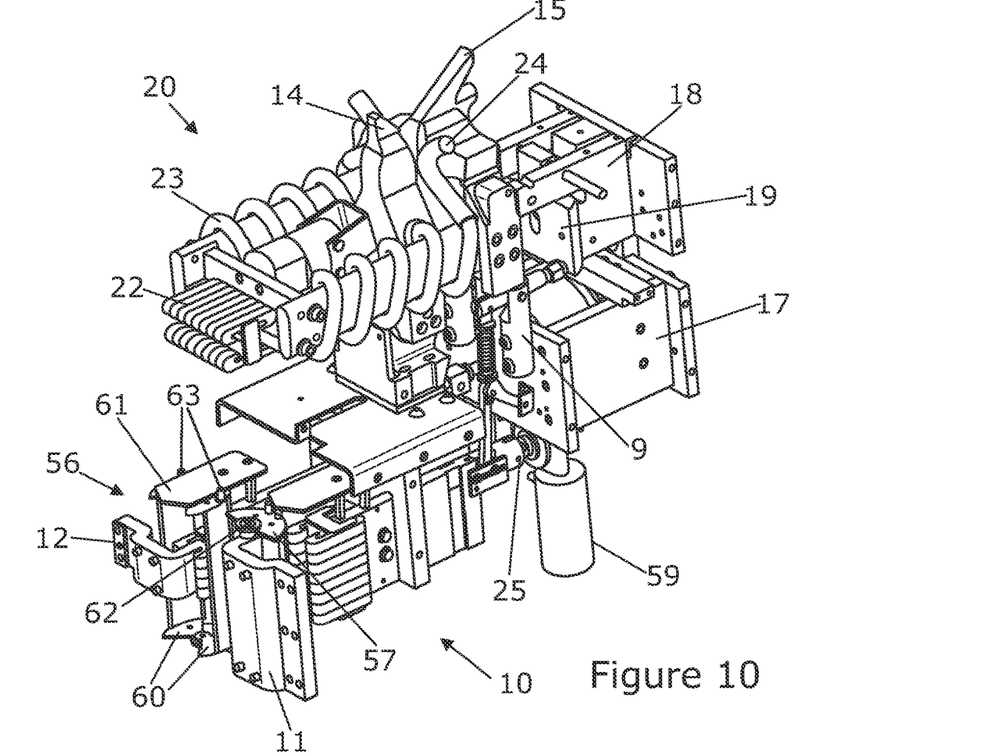
FIG. 10 shows an apparatus comprising the disconnector/changeover switch of FIG. 9 with additional opening members for opening the respective shutters.

FIG. 10 shows a perspective view of the disconnector switch 10 of FIG. 9 connected to the DC circuit breaker 20 shown in FIG. 4. As can be seen in this figure, the first 56 and second 57 shutters each comprise a pair of doors 60 which come together under the bias of a spring 62 to close the pathway, each having a protruding member 63 configured to engage the opening member 61 of the respective moveable contact arm 53, 54. Furthermore, the opening member 61 of the moveable contact arm 53, 54 is shaped to wedge apart the protruding members 63 to force the doors 60 open against the spring bias as the moveable contact arm 53, 54 moves towards the respective terminal 11, 12. As the moveable contact arm 53, 54 is retracted from the respective terminal 11, 12, the spring bias closes the doors 60 again to reduce the risk of a flashover.

Figure 11:
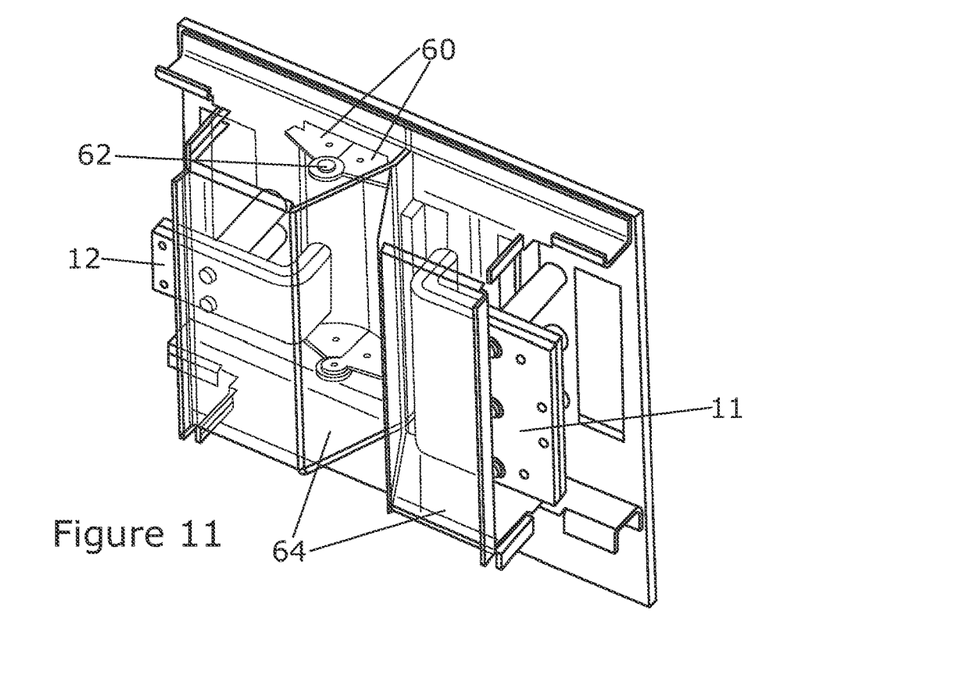
FIG. 11 shows an insulating barrier for isolating the first and second terminals of the disconnector/changeover switch.

FIG. 11 shows greater detail of the first 11 and second 12 terminals of the disconnector switch 10. In this example, the first 11 and second 12 terminals are separated from one another by an electrically insulating barrier 64 (e.g. formed from polycarbonate or another electrically insulating material). The insulating barrier 64 serves to occlude the gap 55 between the first 11 and second 12 terminals to help prevent a direct flashover therebetween. Also, in some examples, the DC circuit breaker 20 and the at least one moveable contact arm 50 of the disconnector switch 10 may be housed within an arc-limiting enclosure (e.g. like the earthed cubicle 49 shown in FIG. 8*a*) in order to contain any arcs generated therein. In this scenario, the first 11 and second 12 terminals of the disconnector switch 10 may be located outside of the arc limiting enclosure, and the shutter mechanism may be configured to open and close respective pathways out of the arc-limiting enclosure through which the at least one moveable contact arm 50 must travel to contact the first 11 and second 12 terminals. In this way, an arc caused by a fault within the arc-limiting enclosure will be sufficiently contained so as to prevent injury to anyone in proximity to the present apparatus, whilst the shutter mechanism serves to inhibit an arc between the first 11 and second 12 terminals of the disconnector switch 10 which could otherwise result in a significant flow of fault current.

Figure 12:
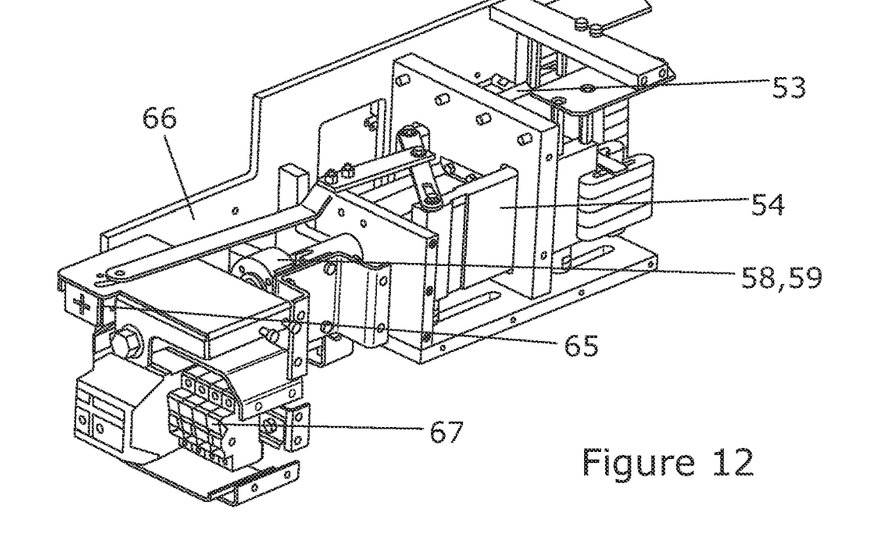
FIG. 12 shows the disconnector/changeover switch of FIG. 9 further comprising a visual position indicator, fuses and transducers.

FIG. 12 is a perspective view of another example of the disconnector switch 10. In this example, the disconnector switch 10 further comprises a visual position indicator 65 indicating its status in the first or second position (or third isolated position if applicable). The visual position indicator 65 is provided by a driven indicator semaphore, but other types are possible. For example, the casing 66 of the disconnector switch 10 may comprise a window giving sight of the relevant moving parts. The disconnector switch 10 also comprises fuses, transducers and any other electronic circuitry 67 required for controlling the disconnector switch 10.

Figure 13:
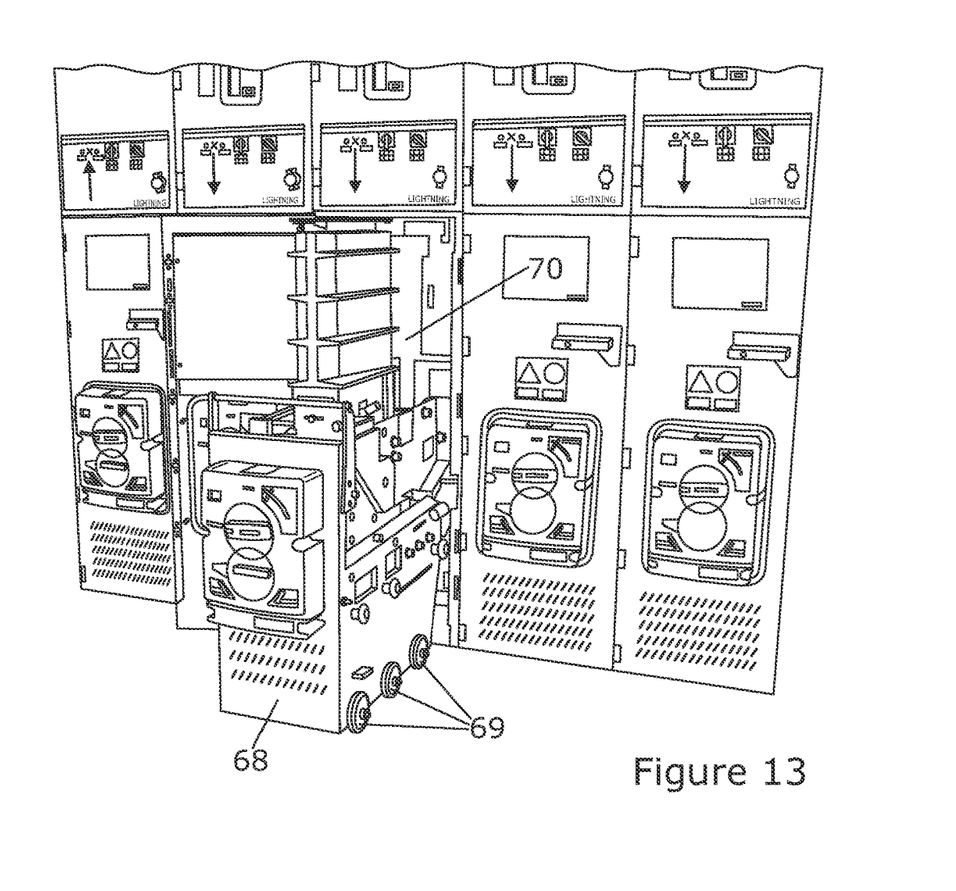
FIG. 13 shows a withdrawable truck comprising a DC circuit breaker and disconnector/changeover switch detached from a cubicle of a power delivery system.

FIG. 13 shows a common detachable unit 68 detached from a cubicle 70 of the power delivery system. The DC circuit breaker and the disconnector switch are incorporated into the common detachable unit 68 which brings them together to simplify implementation of the interlock mechanism coupled therebetween. In this example, the common detachable unit 68 is mounted on wheels 69 to form a withdrawable truck to facilitate detachment from, and reattachment to, the power delivery system. The cubicle 70 itself may be earthed as shown in the schematic diagram of FIG. 8*a*.

This arrangement allows easy access to the DC circuit breaker and disconnector switch for maintenance or emergency replacement without the need for a busbar shutdown of the substation (which can be an expensive exercise) or even part of the rail network (typically even more expensive) for a significant amount of time in the event of a failure of either component. Furthermore, one withdrawable truck 68 can quickly be exchanged for another in order to restore the rail network if need be.

In some examples, one or more shunts, fuses and transducers (or any other traction supply voltage components 67) of the power delivery system may also be incorporated into the common detachable unit/truck 68. This further enhances the safety, maintainability and testing of the equipment by allowing the electronic protection system to be fully tested from shunt to transducer while it is disconnected from the DC traction supply.

The present apparatus has been described in the context of a power delivery system for delivering power to the conductor rails 6, 7 of a railway or tramway infrastructure. However, it can be applied more generally to any power delivery system in which a conductor which is normally at a live potential must be grounded or shorted to a conductor at a safe potential when in a maintenance or out-of-service condition.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

The invention claimed is:

1. An apparatus for use in a power delivery system, the apparatus comprising: a DC circuit breaker having first and second terminals and configured to automatically switch from a closed state to an open state during an overcurrent condition;

a disconnector switch in series with the DC circuit breaker, the disconnector switch having a first terminal for connecting to a first polarity terminal of a DC power supply, a second terminal for connecting to a second polarity terminal of the DC power supply and a common terminal connected to the first terminal of the DC circuit breaker, the disconnector switch having at least a first position in which the first terminal is connected to the common terminal and a second position in which the second terminal is connected to the common terminal; and an interlock mechanism coupled to the DC circuit breaker and the disconnector switch, the interlock mechanism configured to disable the DC circuit breaker from automatically switching from the closed state to the open state during the overcurrent condition when the disconnector switch is in the second position.

2. The apparatus of claim 1, wherein the DC circuit breaker comprises first and second contacts corresponding to the first and second terminals, the first and second contacts located respectively on first and second contact arms of the DC circuit breaker, and wherein at least one of the first and second contact arms is moveable.

3. The apparatus of claim 2, wherein the DC circuit breaker comprises a trip device configured to cause movement of the at least one moveable contact arm during the overcurrent condition, and wherein the interlock mechanism is coupled to the trip device and configured to disable the DC circuit breaker by inhibiting operation of the trip device.

4. The apparatus of claim 3, wherein the trip device comprises an electromagnetic actuator having an armature mechanically coupled to the at least one moveable contact arm, the electromagnetic actuator configured to generate a magnetic flux in response to an overcurrent which causes movement of the armature and a corresponding movement of the at least one moveable contact arm.

5. The apparatus of claim 4, wherein the interlock mechanism is configured to inhibit operation of the trip device by inhibiting movement of the armature.

6. The apparatus of claim 4, wherein the armature is mechanically coupled to the at least one moveable contact arm by a latch, and wherein the interlock mechanism is configured to inhibit operation of the trip device by inhibiting movement of the latch.

7. The apparatus of claim 4, wherein the electromagnetic actuator comprises a primary armature mechanically coupled to the at least one moveable contact arm such that the magnetic flux causes movement of the primary armature and a corresponding movement of the at least one moveable contact arm, and a secondary armature configured to undergo movement when the magnetic flux exceeds a predefined magnitude, movement of the secondary armature reducing the reluctance of the electromagnetic actuator to trigger movement of the primary armature, and wherein the interlock mechanism is configured to inhibit operation of the trip device by inhibiting movement of the primary or secondary armature.

8. The apparatus of claim 4, wherein the interlock mechanism is configured to inhibit operation of the trip device by diverting the magnetic flux generated by the electromagnetic actuator and thereby inhibiting movement of the armature.

9. The apparatus of claim 8, wherein the interlock mechanism comprises a soft magnetic material configured to attract the magnetic flux away from the armature when the disconnector switch is in the second position in order to inhibit said movement.

10. The apparatus of claim 2, wherein the interlock mechanism is coupled to the at least one moveable contact arm of the DC circuit breaker and is configured to disable the DC circuit breaker by inhibiting movement of the at least one moveable contact arm.

11. The apparatus of claim 1, wherein the disconnector switch comprises: at least one moveable contact arm electrically connected to the common terminal:
and a shutter mechanism configured to at least partially occlude a first gap between the at least one moveable contact arm and the first terminal while the disconnector switch is in the second position, and to at least partially occlude a second gap between the at least one moveable contact arm and the second terminal while the disconnector switch is in the first position.

12. The apparatus of claim 11, wherein the at least one moveable contact arm comprises first and second reciprocating arms each electrically connected to the common terminal, the first reciprocating arm moveable between a non-contact position isolated from the first terminal and a contact position in contact with the first terminal, the second reciprocating arm moveable between a non-contact position isolated from the second terminal and a contact position in contact with the second terminal, and
wherein the shutter mechanism comprises first and second shutters, the first shutter configured to open and close a pathway between the first reciprocating arm and the first terminal such that the first shutter is open while the first reciprocating arm is in the contact position and the second reciprocating arm is in the non-contact position, and is closed while the first reciprocating arm is in the non-contact position and the second reciprocating arm is in the contact position, the second shutter configured to open and close a pathway between the second reciprocating arm and the second terminal such that the second shutter is open while the second reciprocating arm is in the contact position and the first reciprocating arm is in the non-contact position, and is closed while the second reciprocating arm is in the non-contact position and the first reciprocating arm is in the contact position.

13. The apparatus of claim 12, wherein the first and second reciprocating arms are connected to one another via a see-saw mechanism and driven by a common motor such that the first reciprocating arm moves from the non-contact position to the contact position while the second reciprocating arm moves from the contact position to the non-contact position and vice-versa.

14. The apparatus of claim 12, wherein the first and second reciprocating arms are driven by respective motors such that the first reciprocating arm only moves from the non-contact position to the contact position once the second reciprocating arm has moved from the contact position to the non-contact position, and the second reciprocating arm only moves from the non-contact position to the contact position once the first reciprocating arm has moved from the contact position to the non-contact position.

15. The apparatus of claim 11, wherein the at least one moveable contact arm comprises a single contact arm configured to undergo pivotal or translational motion between a first position in contact with the first terminal and a second position in contact with the second terminal, and
wherein the shutter mechanism comprises first and second shutters, the first shutter configured to open and close a pathway between the single contact arm and the first terminal such that the first shutter is open while the single contact arm is in the first position and closed while the single contact arm is in the second position, the second shutter configured to open and close a pathway between the single contact arm and the second terminal such that the second shutter is open while the single contact arm is in the second position and closed while the single contact arm is in the first position.

16. The apparatus of claim 12, wherein the first and second shutters each comprise at least one door biased to close the pathway between the at least one moveable contact arm and respective terminal, and wherein the at least one moveable contact arm comprises an opening member configured to force the at least one door open against the bias as the at least one moveable contact arm moves towards the respective terminal.

17. The apparatus of claim 16, wherein the at least one door comprises a pair of doors which come together to close the pathway, each door having a protruding member configured to engage the opening member of the at least one moveable contact arm, and wherein the opening member is shaped to wedge apart the protruding members to force the doors open against the bias as the at least one moveable contact arm moves towards the respective terminal.

18. The apparatus of claim 11, wherein the DC circuit breaker and the at least one moveable contact arm of the disconnector switch are housed within an arc-limiting enclosure and the first and second terminals of the disconnector switch are located outside of the arc-limiting enclosure, and wherein the shutter mechanism is configured to open and close respective pathways out of the arc-limiting enclosure through which the at least one moveable contact arm must travel to contact the first and second terminals.

19. The apparatus of claim 1, wherein the first and second terminals of the disconnector switch are separated from one another by an insulating barrier.

20. The apparatus of claim 1, wherein the DC circuit breaker and disconnector switch are formed on a common detachable unit of the power delivery system.

21. The apparatus of claim 20, wherein the common detachable unit is mounted on wheels to facilitate detachment from, and reattachment to, the power delivery system.

22. The apparatus of claim 20, wherein the common detachable unit further comprises one or more shunts, fuses and transducers of the power delivery system.

23. A method of configuring a power delivery system, the method comprising: connecting a disconnector switch to a DC power supply such that a first terminal of the disconnector switch is connected to a first polarity terminal of the DC power supply and a second terminal of the disconnector switch is connected to a second polarity terminal of the DC power supply; the disconnector switch having at least a first position in which the first terminal is connected to a common terminal of the disconnector switch and a second position in which the second terminal is connected to the common terminal of the disconnector switch;

connecting the common terminal of the disconnector switch to a first terminal of a DC circuit breaker having first and second terminals and configured to automatically switch from a closed state to an open state during an overcurrent condition;

coupling an interlock mechanism to the DC circuit breaker and the disconnector switch such that the interlock mechanism can disable the DC circuit breaker from automatically switching from the closed state to the open state during the overcurrent condition when the disconnector switch is in the second position;

connecting the second terminal of the DC circuit breaker to a first power line; and connecting the second terminal of the disconnector switch and the second polarity terminal of the DC power supply to a second power line.

24. A computer program comprising computer code configured to perform the method of claim 23.

* * * * *